J. F. KEITZ.
EYE SHIELD FOR AUTOMOBILE DRIVERS.
APPLICATION FILED AUG. 29, 1919.
1,353,759.
Patented Sept. 21, 1920.
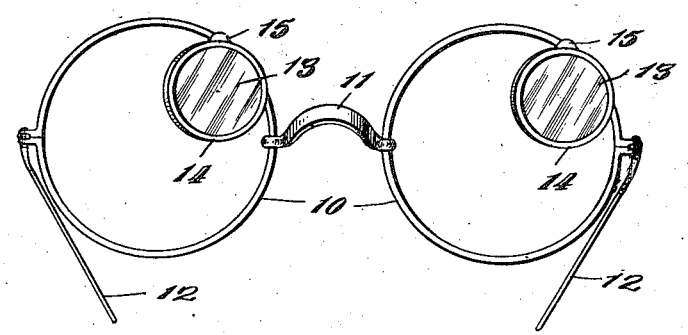
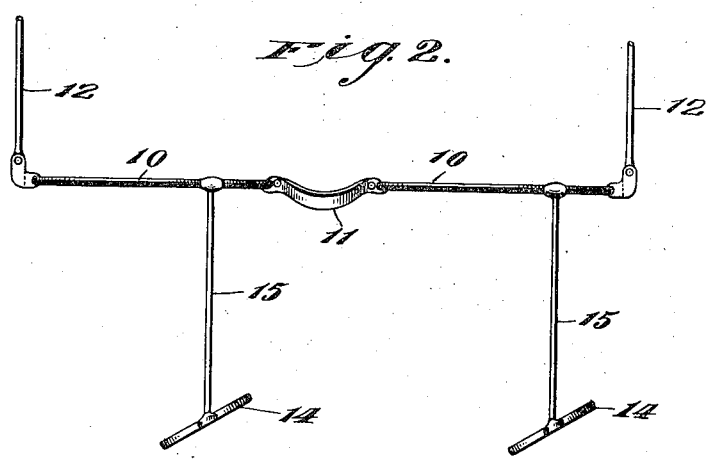
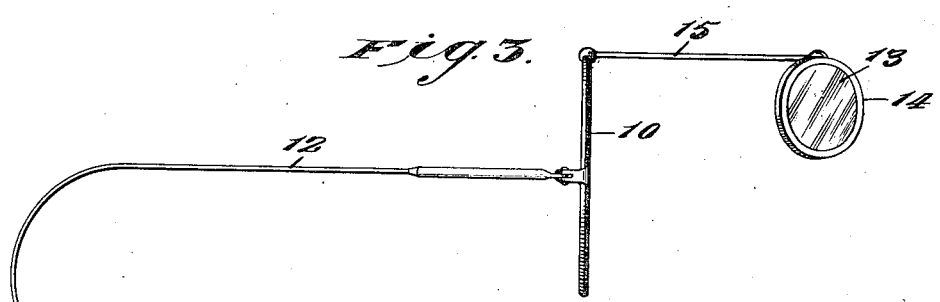
WITNESSES
INVENTOR
JOSEPH F. KEITZ
BY
ATTORNEYS

UNITED STATES PATENT OFFICE.

JOSEPH F. KEITZ, OF JERSEY CITY, NEW JERSEY.

EYE-SHIELD FOR AUTOMOBILE-DRIVERS.

1,353,759.  Specification of Letters Patent.  Patented Sept. 21, 1920.

Application filed August 29, 1919. Serial No. 320,635.

*To all whom it may concern:*

Be it known that I, JOSEPH F. KEITZ, a citizen of the United States, and a resident of Jersey City, in the county of Hudson and State of New Jersey, have invented a new and Improved Eye-Shield for Automobile-Drivers, of which the following is a full, clear, and exact description.

My invention relates to a means to be worn by the driver and supported after the manner of eyeglasses or spectacles and adapted to be utilized by the driver for avoiding the glare from the lights of an automobile coming in the opposite direction or turning into the roadway from the left.

An object of the invention is to provide right and left eye shields so supported as to be out of the normal or straight-ahead line of vision and so arranged that a slight movement of the head of the user forwardly and downwardly will serve to bring the eye shields into the oblique lines of vision and thereby be disposed between the eyes of the wearer and the lights of an automobile facing in the opposite direction or turning from the left into the roadway.

A further object of the invention is to provide means whereby the supporting means of the right and left shields may be varied to suit the wearer irrespective of the distance between the eyes.

The above and other objects as will appear are attained by the novel arrangement hereinafter more particularly described and defined in the claims.

Reference is to be had to the accompanying drawings forming a part of this specification, it being understood that the drawings are merely illustrative of one example of the invention.

Figure 1 is a front view of an eye shield embodying my invention;

Fig. 2 is a plan view thereof;

Fig. 3 is a side elevation.

In carrying out my invention a suitable frame 10 is provided adapted to be held on the nose of the wearer after the manner of eyeglasses or spectacles. In the form here shown, the frame presents right and left circular frame elements similar to a lens frame or frames of spectacles and connected by a bridge 11, the right and left frames having spectacle temples 12, whereby the device will be sustained in position. Frame 10 may, as shown, be of a form adapted to receive lenses, but its essential office in the present case is to afford support for diaphonous or transpicuous right and left shields 13 which in practice may be formed of colored or smoked glass, celluloid, mica, or the like. Said disks 13 are held in frames 14 on the front ends of arms 15 on frame 10. The arms 15 are positioned on the frame 10 at different distances from the bridge 11, the right arm being near to said bridge and the left arm farther from the bridge. The shields 13 are disposed in planes substantially parallel with each other and oblique to the general plane of the supporting frame 10, and therefore, will be in planes at right angles to the oblique lines of vision in looking therethrough toward the left. Also, the supporting arms 15 are so positioned on the frame 10 at the top that the shields 13 will be above the position of use, being disposed above and adjacent to the normal oblique lines of vision in viewing a vehicle at the left of that of the driver. In practice, the device having been adjusted in position by the driver the frame 10 will afford a clear vision unobstructed and unimpaired by the shield elements 13 but upon the device being dipped forwardly by the lowering of the head of the user, the respective shields are brought into the positions to be in the line of vision of the driver in viewing an approaching vehicle at the left. By having the shields sustained by the arms 15 or equivalent supporting means a substantial distance in front of the plane of the frame 10, it will readily be seen that only the slightest lowering of the head of the driver is required to bring the shields downwardly into the line of vision. When not required to be brought into action, the shields and their supporting means afford no obstruction to the ordinary vision straight-ahead or to the sides but can be brought into action instantly upon an appearance of a glaring light coming in the opposite direction.

The arms 15 are bendable in order that the positions of the shields 13 may be varied to suit the distance between the eyes of individual wearers.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. An eye shield for automobile drivers, including a frame having means to sustain it in position on the wearer and permit unobstructed normal vision, right and left eye shields, and means extending forwardly from said frame at the top and permanently supporting said eye shields in positions above the horizontal axis of said frame and a substantial distance forwardly of the plane thereof, so that the shields thereby lie above the normal lines of vision and laterally of the straight-ahead lines of vision for requiring the tilting of said frame forwardly for bringing the said shields into oblique lines of vision.

2. An eye shield for automobile drivers, including a frame having means to sustain it in position on the wearer and permit unobstructed straight-ahead vision, right and left eye shields in planes oblique to the general plane of the frame, means supporting said shields forwardly of the frame and laterally of the normal lines of straight-ahead vision for permitting of the wearer bringing said shields into oblique lines of vision.

JOSEPH F. KEITZ.